US012382177B2

(12) United States Patent
Pleiman et al.

(10) Patent No.: US 12,382,177 B2
(45) Date of Patent: Aug. 5, 2025

(54) PROVIDING A ZOOMED VIEW OF A DISTANT OBJECT TO A USER DEVICE USING OTHER DEVICES CLOSER TO THE DISTANT OBJECT

(71) Applicant: DISH Network L.L.C., Englewood, CO (US)

(72) Inventors: Eric Pleiman, Centennial, CO (US); Jesus Flores Guerra, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 215 days.

(21) Appl. No.: 18/184,563

(22) Filed: Mar. 15, 2023

(65) Prior Publication Data
US 2024/0314437 A1    Sep. 19, 2024

(51) Int. Cl.
*H04N 23/69*  (2023.01)
*G06T 17/00*  (2006.01)
*H04N 5/265*  (2006.01)
*H04N 23/66*  (2023.01)

(52) U.S. Cl.
CPC ............. *H04N 23/69* (2023.01); *G06T 17/00* (2013.01); *H04N 5/265* (2013.01); *H04N 23/66* (2023.01)

(58) Field of Classification Search
CPC ......... H04N 23/69; H04N 23/66; G06T 17/00
See application file for complete search history.

(56) References Cited

U.S. PATENT DOCUMENTS

| | | | |
|---|---|---|---|
| 9,665,773 B2* | 5/2017 | Zomet | G06V 20/30 |
| 2003/0179113 A1* | 9/2003 | Apostolopoulos | H03M 7/30 375/E7.263 |
| 2011/0013049 A1* | 1/2011 | Thorn | H04N 1/00307 345/173 |
| 2012/0268612 A1* | 10/2012 | Wang | G06F 18/211 348/207.1 |
| 2016/0323559 A1* | 11/2016 | Matsunobu | H04N 13/243 |
| 2022/0172474 A1* | 6/2022 | Takahashi | H04N 23/90 |

* cited by examiner

*Primary Examiner* — Nicholas R Wilson
(74) *Attorney, Agent, or Firm* — Perkins Coie LLP

(57) ABSTRACT

The disclosed system receives a first request from a first user device to record, using a first camera, a first image of an object in a surrounding environment. The first request includes an indication to zoom the first camera, wherein zooming the camera enlarges an appearance of the object in the image. The system sends a second request to a second user device to record a second image of the object. The second user device is closer to the object than the first user device. A first orientation of the first user device and a second orientation of the second user device satisfies a first criterion. The system causes the second user device to record the second image of the object using the second camera, receives the second image from the second user device, and provides the second image to a display of the first user device.

20 Claims, 6 Drawing Sheets

PROVIDING A ZOOMED VIEW OF A DISTANT OBJECT TO A USER DEVICE USING OTHER DEVICES CLOSER TO THE DISTANT OBJECT

BACKGROUND

The optical digital zoom function on existing cameras and mobile phones is limited to a single camera. While there have been improvements in zoom and image processing to get a better image, the photo is still limited by a single user's vantage point and the capabilities of the camera/device. The problem is, even with the best zoom, the user still might not have the best view and is still limited to line of sight. If there is an obstacle, the user will not be able to observe the target. Also, different lighting conditions may create an added challenge to using zoom from a single vantage point.

BRIEF DESCRIPTION OF THE DRAWINGS

Detailed descriptions of implementations of the present invention will be described and explained through the use of the accompanying drawings.

Figure 1:
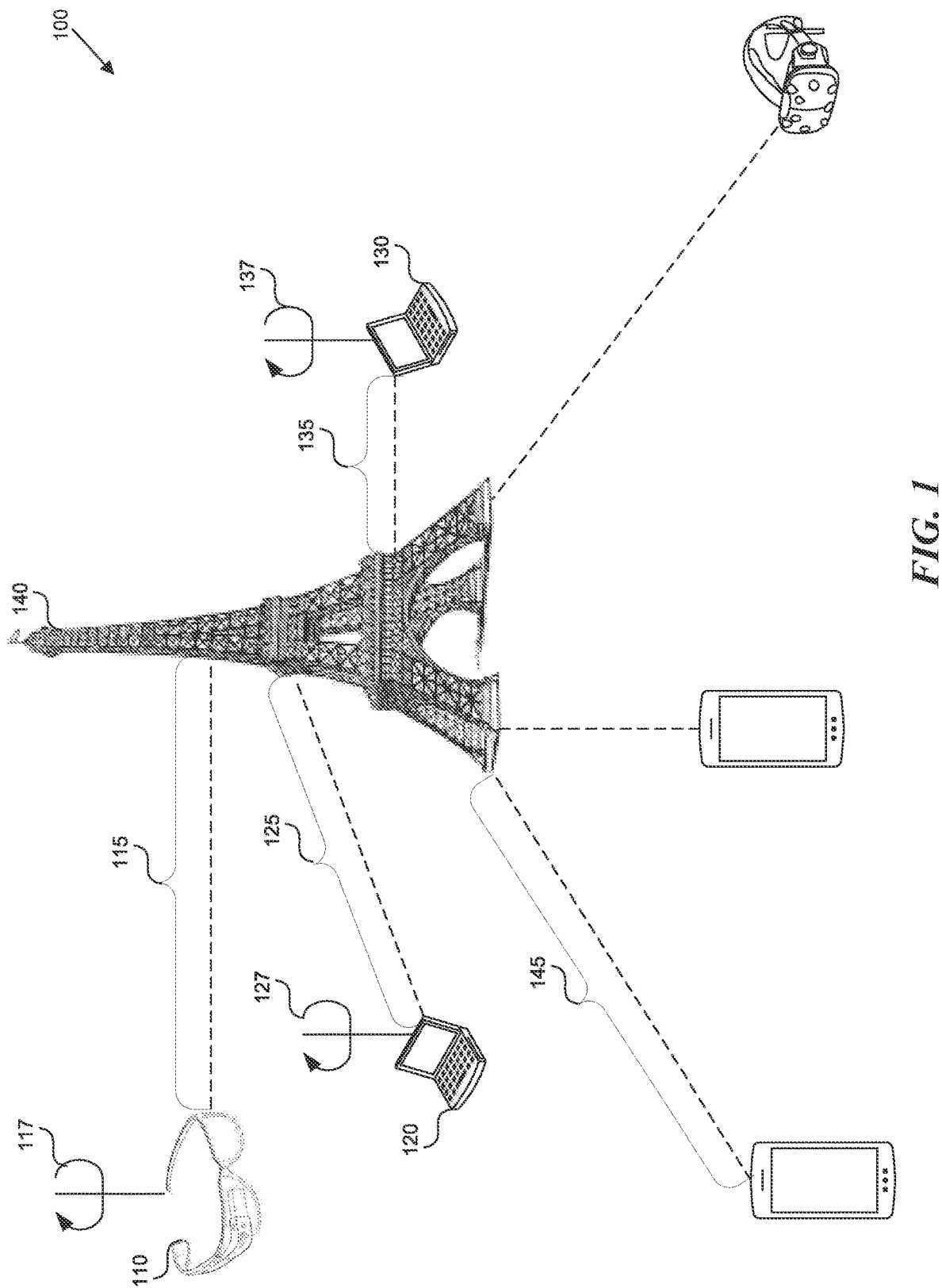
FIG. 1 shows an overview of the system to provide a zoomed view of a distant object using devices closer to the distant object.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method provide a zoomed view of a distant object to a user device using other devices closer to the distant object. The system receives a request A from a user device A to record, using a camera A, an image A of an object in a surrounding environment associated with the user device A. The user device can include an augmented reality (AR)/virtual reality (VR) device, a mobile device, a wearable device, a camera, etc. The request A includes an indication to zoom the camera, where zooming the camera enlarges an appearance of the object in the image. The system can determine that the request A includes the indication to zoom the camera by receiving the input to zoom from the user, or by determining that the object is below a certain threshold on the screen.

The system sends a request B to a user device B to record an image B of the object in the surrounding environment using a camera B of the user device B, where the user device B is closer to the object than the user device A and where an orientation A associated with the user device A is within a predetermined tolerance of an orientation B associated with the user device B. The predetermined tolerance can be +/−5° or +/−10°.

The system causes the user device B to record the image B of the object using the camera B and receives the image B from the user device B. The system provides the image B to a display of the user device A.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples. Provide a Zoomed View of a Distant Object to a User Device Using Other Devices Closer to the Distant Object FIG. 1 shows an overview of the system to provide a zoomed view of a distant object using devices closer to the distant object. In today's world, user devices ("devices") 110, 120, 130 (only three labeled for brevity), such as VR, AR, computers, cameras (including single-lens reflex cameras and video cameras), tablets, mobile phones, and wearable devices, all have cameras with digital zoom that can record a visual representation, e.g., image, video, a three-dimensional representation of the object such as a point cloud, etc. In some cases, the user device 110 may want to record an image of an object 140, may be far away from the object, and may need to zoom the camera to obtain a good visual representation of the object 140.

The system 100 can determine other devices 120, 130 that are closer to the object 140 than the requesting device 110, and instead, the system 100 can request from the other devices 120, 130 to record the virtual representation requested by the user device 110. By virtue of the devices 120, 130 being closer to the object 140, the user device 110 receives a zoomed-in visual representation of the object.

To determine from which other devices 120, 130 to request the visual representation, the server can determine a distance 115, 125, 135, 145 (only four labeled for brevity) between the other devices and the object 140. Based on a distance 115, 125, 135, 145, the server can request the visual representation from the devices 120, 130 that are closer to the object 140 than the requesting device 110.

In addition to the distance, and selecting the other devices 120, 130, the system can take into consideration orientation 117, 127, 137 (only three labeled for brevity). The system can request the visual representation from the device among the closer other devices 120, 130 that has the closest orientation to the orientation 117 of the user device 110.

For example, if the requesting device is user device 110, and its orientation is orientation 117, the other devices closer to the object 140 are user devices 120, 130. Out of the two user devices 120, 130, the orientation 127 of the user device 120 is closer to the orientation 117 of the user device 110. Specifically, user devices 110, 130 have almost a 180° difference in view of the object 140, while the user devices 110, 120 have approximately 45° difference in view of the object 140. The system 100 can request the visual representation only from the device 120, which is closer to the object 140 and has a similar orientation to the orientation 117 of the user device 110. Alternatively, the system can request the visual representations from both devices 120, 130 and can provide both visual representations to the user device 110, while accenting, or highlighting, the visual representation recorded by the device 120, as described in this application.

To identify the group of devices 110, 120, 130, which can use each other's cameras to obtain a zoomed-in visual representation, the system 100 can obtain preexisting grouping of devices. For example, the devices 110, 120, 130 can be members of a public group which enables any device to access their cameras for zoom purposes. In another example, the devices 110, 120, 130 can be members of a private group such as a group of Android devices or Apple devices that allow other members of the private group to access their cameras for zoom purposes.

Figure 2:
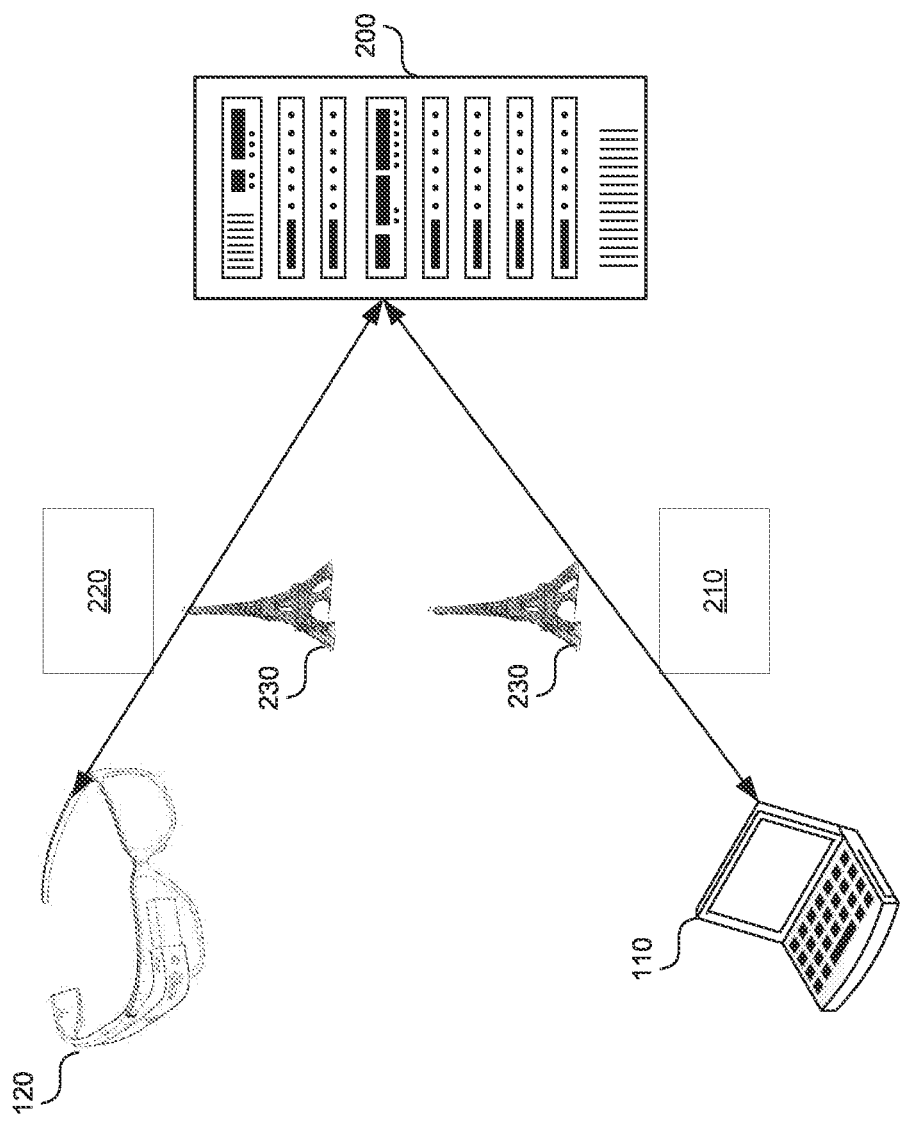
FIG. 2 shows components of the system.

FIG. 2 shows components of the system 100 in FIG. 1. In one embodiment, the system 100 can include a server 200, e.g. a cloud server, and the devices 110, 120. The device 110 can send a request 210 to the server 200 requesting to record a visual representation of the object 140 in FIG. 1. The server 200 can identify the device 120 as being closer to the object 140 and/or having a similar orientation to the device 110.

Upon identifying the device 120, the server 200 can send a request 220 to the device 120 to record the visual representation of the object 140. Once the device 120 records the visual representation, the server 200 can receive the visual representation 230 from the device 120 and can provide the visual representation 230 to the device 120.

Alternatively, if the server 200 is not available, the devices 110, 120 can communicate through a mesh network directly with each other. The devices 110, 120 can directly share the visual representation 230 with each other, without sending the visual representation 230 to the server 200.

Figure 3:
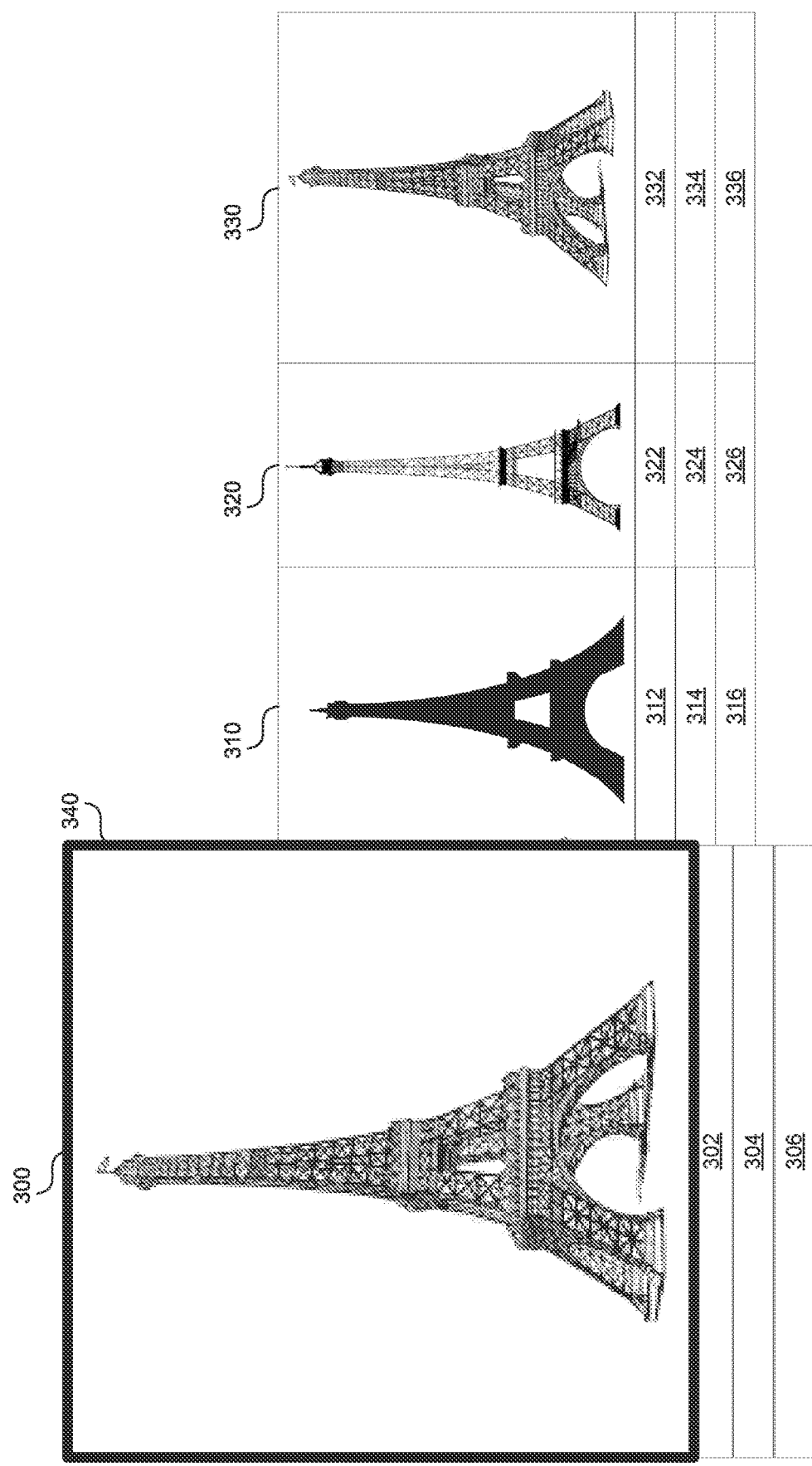
FIG. 3 shows a selection of zoomed-in visual representations presented to the user device.

FIG. 3 shows a selection of zoomed-in visual representations presented to the user device 110. The system 100 in FIG. 1, upon receiving the request 210 to provide a zoomed-in visual representation of the object, can obtain multiple visual representations 300, 310, 320, 330 from multiple user devices having multiple orientations. The user devices can upload visual representations 300, 310, 320, 330 using metadata including location 302, 312, 322, 332, e.g., Global Positioning System (GPS) location, timestamp information 304, 314, 324, 334, indicating when the visual representation was recorded, and/or orientation information 306, 316, 326, 336, indicating the orientation of the device recording the visual representation. The user devices can upload the visual representations 300, 310, 320, 330 to the cloud server 200 in FIG. 2, enabling the server to provide a zoomed-in version of the visual representation to the device 110 from previously recorded visual representations.

The system 100 can employ various criteria to select and present one or more visual representations 300, 310, 320, 330 to show on the user device 110. In one embodiment, the system 100 can present the visual representation 310 that is the best according to a criterion. In another embodiment, the system 100 can present the visual representation 300 that is the best according to the criterion as accented or highlighted, such as being larger in size or having a thicker frame 340 as shown in FIG. 3, and the rest of the visual representations 310, 320, 330 of the object having a smaller size, or having a slimmer frame, than the accented visual representation 300.

The criterion to select the best visual representation 300 can be that the point of view from which the visual representation 300 is taken is the most similar to the point of view of the user device 110. The point of view can include the orientation of the user device 110 and the orientation of the device recording the visual representation 300. The visual representations 300, 310, 320, 330 can be presented to the user group by orientation similarity. For example, the system 100 can extract orientation information 306, 316, 326, 336 from the visual representations 300, 310, 320, 330 and can group the visual representations in increments of 5°. Specifically, the system 100 can create one group out of visual representations 300, 310, 320, 330 whose point of view differs by +/−5° From the point of view of the user device 110 while creating another group from visual representations whose point of view differs by +/−10°.

Another criterion to select the best visual representation 300 can be that the user device recording the best visual representation 300 is the closest to the object. A third criterion can include that the best visual representation 300 is the most aesthetically pleasing of the visual representations 300, 310, 320, 330. To determine whether a visual representation is aesthetically pleasing, an artificial intelligence (AI) can rank the visual representations 300, 310, 320, 330 from the most pleasing to the least pleasing. Alternatively, users of various user devices and/or social media users can rank the visual representations 300, 310, 320, 330, and the system can present highest ranked visual representations to the user.

A fourth criterion can include a time of day. For example, if the system 100 can retrieve a zoomed-in visual representation 300 from previously stored visual representations, the system can determine the time of day when the request 210 in FIG. 2 from the user device 110 is received and can find a visual representation among the stored visual representations that most closely matches the time of day. Consequently, the lighting in the visual representation 300 can be the most similar to the lighting surrounding the user device 110.

Further, the system 100 can extract the timestamp information 304, 314, 324, 334 from the visual representations 300, 310, 320, 330 and can group the visual representations according to predetermined time blocks such as quarter, one-half or one-hour time blocks. The different blocks can allow a user to look for visual representations under different lighting conditions throughout the day. For example, if the user device 110 requests to take a zoomed-in visual representation in the morning, e.g., sunrise, the system 100 can present sunrise visual representation as the accented visual representation 300, but can also present a visual representation 310 taken at sunset and/or from a different angle.

Based on multiple visual representations 300, 310, 320, 330 at multiple times of day under different lighting conditions from multiple points of view of the same object 140 in FIG. 1, the system 100 can create a three-dimensional virtual object representing the object 140. The three-dimensional virtual object can include color and texture obtained from the visual representations 300, 310, 320, 330. Consequently, in addition to the images taken in response to the request 210 in FIG. 2 and previously stored images, the system 100 can create a photorealistic image of the three-dimensional virtual object and provide the rendering of the three-dimensional virtual object from the point of view of the user device 110. The system 100 can obtain information about the location and orientation of the user device 110 from the request 210. Consequently, at least one of the visual representations 300, 310, 320, 330 can be a rendering of the three-dimensional virtual object.

The server 200 can have access to millions of visual representations of the object 140. Based on the stored visual representations, the server 200 can edit the stored visual representations and/or the visual representations recorded in response to the request 210 to remove temporary objects, such as people, animals, or debris.

In addition to selecting visual representations 300, 310, 320, 330 to present to the user, the server 200 can combine the multiple visual representations to obtain a single visual representation. For example, the server 200 can stitch multiple images into a single image to create a panoramic view and can present the panoramic view to the user.

Figure 4:
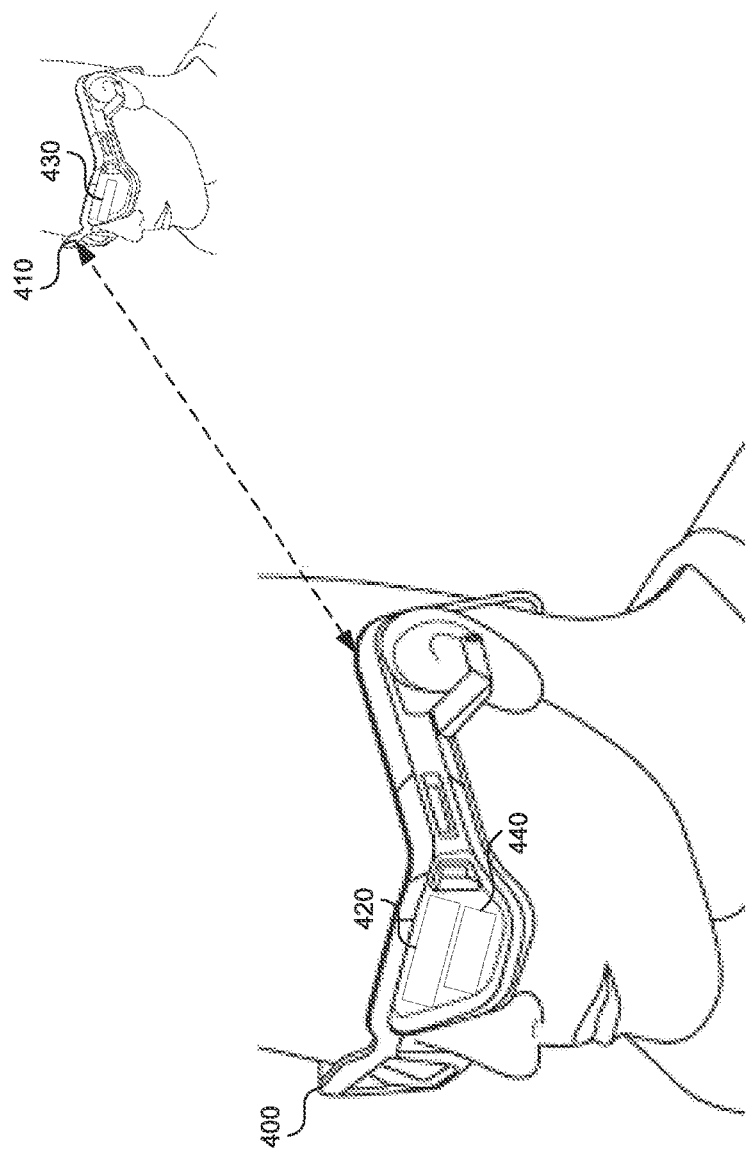
FIG. 4 shows notification presented on a user device requesting a zoomed-in visual representation and a user device recording the zoomed-in visual representation.

FIG. 4 shows notification presented on a user device requesting a zoomed-in visual representation and a user device recording the zoomed-in visual representation. The user device 400 can be closer to the object of interest than the user device 410. Once the server 200 in FIG. 2 receives the request 210, and identifies the user device 400 as closer to the object of interest, the user device 400 can present a notification 420 informing the user of the user device 400 that the user device 400 is recording a visual representation to show on a different device. In one embodiment, the user can decline the notification, thus declining to record the visual representation. The system 100 can also provide a notification 430 on the user device 410, indicating that the user device 410 is receiving a zoomed inversion from another device.

To incentivize the user of the user device 400 to record visual representations and share them with other users, the system 100 can provide rewards to the user, such as a virtual reward or a cryptocurrency reward for a certain number of shared visual representations, such as 100 or 500.

When the user device 400 records the visual representation, the user device 400 can present a user interface 440 asking the user whether to save the visual representation in private storage, available only to the user device 400, or to upload the visual representation to the server 200 in FIG. 2, thus enabling the server to share the visual representation.

Figure 5:
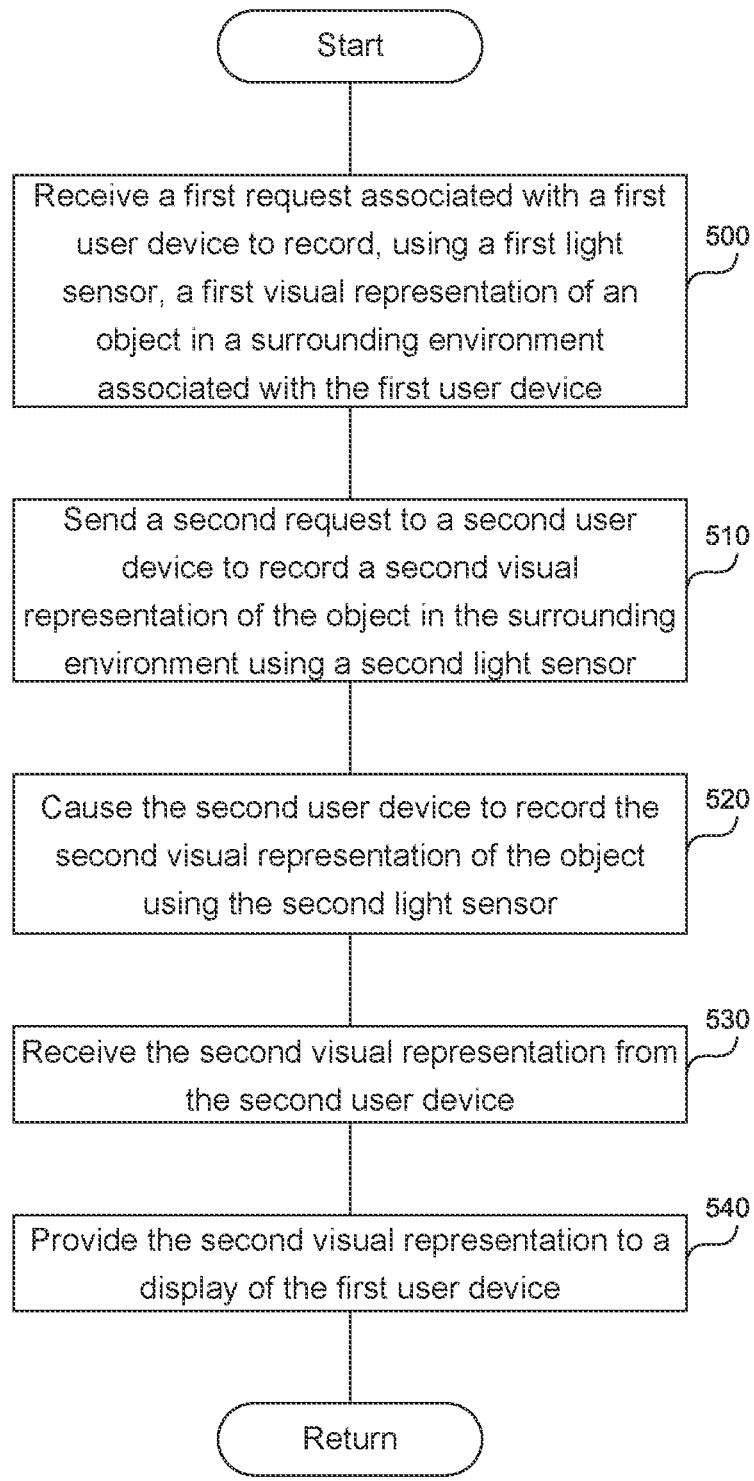
FIG. 5 is a flowchart of a method to provide a zoomed view of a distant object using devices closer to the distant object.

FIG. 5 is a flowchart of a method to provide a zoomed view of a distant object using devices closer to the distant object. A hardware or software processor executing instructions describing this application, in step 500, can receive a first request associated with a first user device to record, using a first light sensor, a first visual representation of an object in a surrounding environment associated with the first user device. The processor can be associated with the first user device and, for example, can receive an indication from the user to record a zoomed-in visual representation, or can receive an indication from an application to record the zoomed-in visual representation. The processor can be associated with the server, e.g., server 200 in FIG. 2, and can receive an indication from the first user device to record the first visual representation. The visual representation can include an image, a video, a three-dimensional representation such as a point cloud or mesh, etc. The user device can include an AR/VR device, a mobile device, a light sensor such as a camera or a rangefinder, a wearable device, a laptop, a desktop, etc. The light sensor can include a camera associated with the device, a rangefinder, a three-dimensional scanner, etc.

The first request can include an indication to zoom the first light sensor, where zooming the first light sensor enlarges an appearance of the object in the visual representation. The processor can determine that the first request includes an indication to zoom the first light sensor by receiving an input from the user to zoom in or by determining that an object in the center of the visual representation is below a certain threshold size, such as below a certain number of pixels or below a certain percentage of the image.

In step 510, the processor can send a second request to a second user device to record a second visual representation of the object in the surrounding environment using a second light sensor, where the second user device is closer to the object than the first user device and where a first orientation associated with the first user device and a second orientation associated with the second user device satisfies a first criterion. In one embodiment, the first criterion can be that the second user device is the closest in orientation to the first user device out of all devices that are configured to record the zoomed-in visual representation. In another embodiment, the first criterion can include that the first orientation and the second orientation of are within a predetermined tolerance of each other such as +/−5° or +/−10°. For example, the server 200 in FIG. 2 can select the second user device such that the second user device is the closest to the orientation of the first user device out of all the available devices. In another example, the first device can communicate with other devices through a mesh network, and the first device can select the second device that is closest to the orientation of the first device out of all available devices.

In step 520, the processor can cause the second user device to record the second visual representation of the object using the second light sensor. In step 530, the processor can receive the second visual representation from the second user device. In step 540, the processor can provide the second visual representation to a display of the first user device.

The processor can send the first request to multiple user devices to record multiple visual representations of the object in the surrounding environment using multiple light sensors associated with the multiple user devices. The multiple user devices can be all the devices that have opted into public sharing, and/or all the devices that are part of the same group as the current device, such as all Apple devices or all Android devices. The processor can obtain multiple visual representations from the multiple user devices. The processor can rank the multiple visual representations based on a second criterion. The processor can present at the first device at least a portion of the multiple ranked visual representations including a highest ranked visual representation among the multiple ranked visual representations, where the highest ranked visual representation is accented.

The second criterion can include a similarity of the first orientation and a third orientation associated with a third device among the multiple devices, a proximity between the third device among the multiple devices and the object, or an aesthetic appeal associated with the multiple visual representations. The aesthetic appeal can be determined by an AI ranking received images. Alternatively, the aesthetic appeal can be determined by social media users.

The processor can send the first request to multiple user devices to record multiple visual representations of the object in the surrounding environment using multiple light sensors associated with the multiple user devices. The processor can obtain multiple visual representations from the multiple user devices. The processor can combine at least a portion of the multiple visual representations to obtain a combined image. To create the combined image, the processor can stitch multiple images to create a panoramic image. The processor can present the combined image on the user device.

The processor can receive multiple visual representations including multiple timestamps, where a timestamp among the multiple times indicates when a particular visual representation among the multiple particular visual representations is recorded. The processor can group the multiple visual representations into multiple groups based on the multiple timestamps. The processor can present the multiple groups on the display of the first device, thereby enabling a user of the first device to view the multiple visual representations under different lighting conditions.

The processor can send the first request to multiple user devices to record multiple visual representations of the object in the surrounding environment using multiple light sensors associated with the multiple user devices. The processor can obtain multiple visual representations from the multiple user devices. Based on the multiple visual representations, the processor can create a three-dimensional model associated with the object. The processor can receive a third request to create a third visual representation associated with the object. The processor can render the three-dimensional model associated with the object to create the third visual representation.

The processor can send the first request to multiple user devices to record multiple visual representations of the object in the surrounding environment using multiple light sensors associated with the multiple user devices. The processor can obtain the multiple visual representations from the multiple user devices, stored images associated with the object, and rendered images of a virtual object corresponding to the stored object. The processor can rank the multiple visual representations, stored images associated with the object, and rendered images of a virtual object corresponding to the stored object based on the second criterion, as described in this application, to obtain multiple ranked visual representations. The processor can present at the first device at least a portion of the multiple ranked visual representations including a highest ranked visual representation among the multiple ranked visual representations, where the highest ranked visual representation is accented.

Computer System

Figure 6:
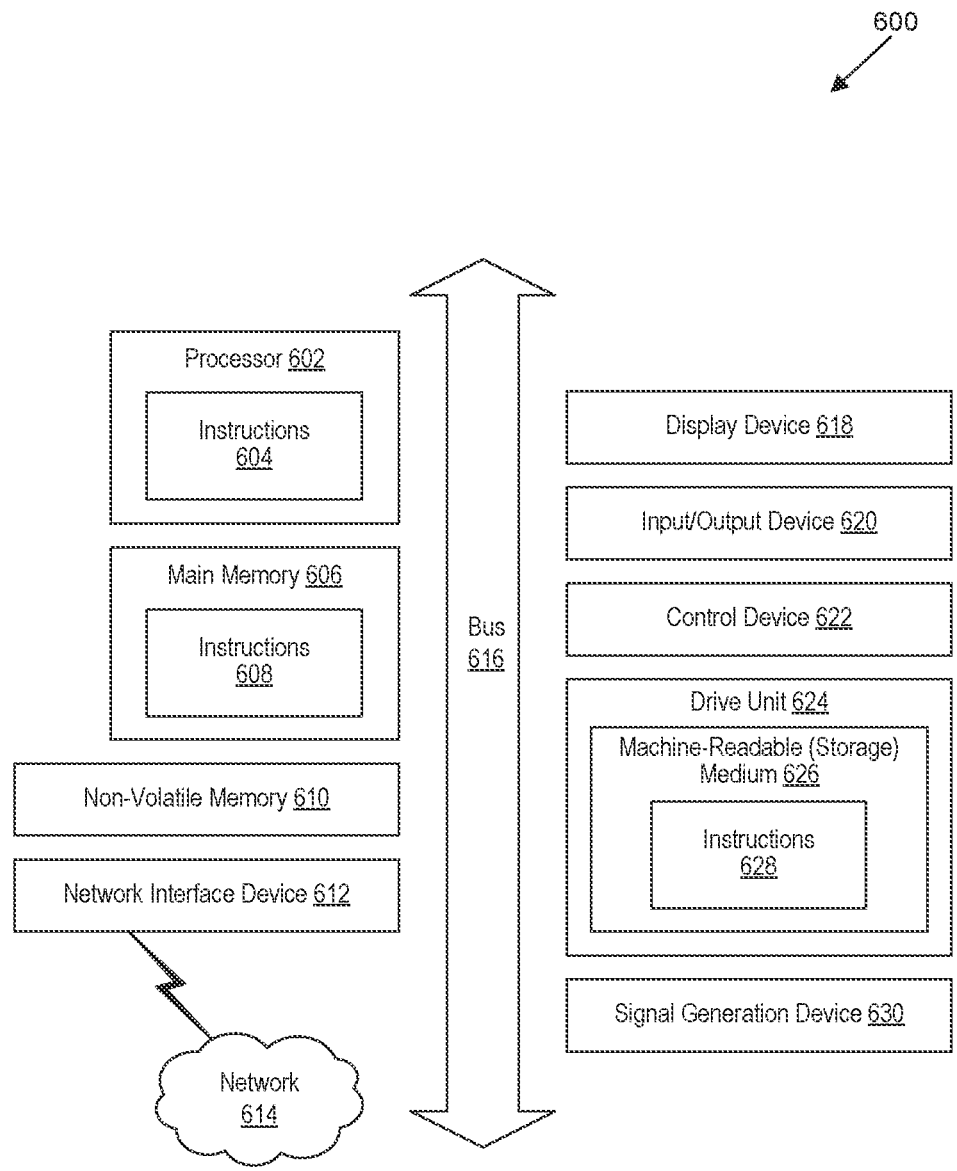
FIG. 6 is a block diagram that illustrates an example of a computer system in which at least some operations described herein can be implemented.

FIG. 6 is a block diagram that illustrates an example of a computing system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computing system 600. In some implementations, the computer system 600 can be an embedded computer system, a system-on-chip (SOC), a single-board computer (SBC) system, or a distributed system such as a mesh of computer systems or can include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable (storage) medium 626) can be local, remote, or distributed. Although shown as a single medium, the machine-readable (storage) medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable (storage) medium 626 can be non-transitory or comprise a non-transitory device. In this context, a non-transitory storage medium can include a device that is tangible, meaning that the device has a concrete physical form, although the device can change its physical state. Thus, for example, "non-transitory" refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory computer-readable storage medium storing instructions, which, when executed by at least one data processor of a system, cause the system to:
   receive a first request from a first user device to record, using a first camera, a first image of an object in a surrounding environment associated with the first user device,
      wherein the first request includes an indication to zoom the first camera, wherein zooming the first camera enlarges an appearance of the object in the first image;
   identify a group of user devices that can use each other's cameras to obtain a zoomed-in appearance of the object,
      wherein the group of user devices includes the first user device and a second user device;
   send a second request to the second user device among the group of user devices to record a second image of the object in the surrounding environment using a second camera associated with the second user device,
      wherein the second user device is closer to the object than the first user device and
      wherein a first orientation associated with the first user device is within a predetermined tolerance of a second orientation associated with the second user device;
   cause the second user device to record the second image of the object using the second camera;
   receive the second image from the second user device; and
   provide the second image to a display of the first user device.

2. The at least one non-transitory computer-readable storage medium of claim 1, comprising instructions to:
   send the first request to multiple user devices to record multiple images of the object in the surrounding environment using multiple cameras associated with the multiple user devices;
   obtain the multiple images from the multiple user devices;

rank the multiple images based on a criterion to obtain multiple ranked images; and
present at the first user device at least a portion of the multiple ranked images including a highest ranked image among the multiple ranked images, wherein the highest ranked image is accented.

3. The at least one non-transitory computer-readable storage medium of claim 2, wherein the criterion includes: a similarity of the first orientation and a third orientation associated with a third device among the multiple user devices, a proximity between the third device among the multiple user devices and the object, or an aesthetic appeal associated with the multiple images.

4. The at least one non-transitory computer-readable storage medium of claim 1, comprising instructions to:
send the first request to multiple user devices to record multiple images of the object in the surrounding environment using multiple cameras associated with the multiple user devices;
obtain the multiple images from the multiple user devices;
combine at least a portion of the multiple images to obtain a combined image; and
present the combined image on the first user device.

5. The at least one non-transitory computer-readable storage medium of claim 1, comprising instructions to:
receive multiple images including multiple timestamps, wherein a timestamp among the multiple timestamps indicates when a particular image among the multiple images is recorded;
group the multiple images into multiple groups based on the multiple timestamps; and
present the multiple groups on the display of the first user device, thereby enabling a user of the first user device to view the multiple images under different lighting conditions.

6. The at least one non-transitory computer-readable storage medium of claim 1, comprising instructions to:
send the first request to multiple user devices to record multiple images of the object in the surrounding environment using multiple cameras associated with the multiple user devices;
obtain the multiple images from the multiple user devices;
based on the multiple images, create a three-dimensional model associated with the object;
receive a third request to create a third image associated with the object; and
render the three-dimensional model associated with the object to create the third image.

7. The at least one non-transitory computer-readable storage medium of claim 1, comprising instructions to:
send the first request to multiple user devices to record multiple images of the object in the surrounding environment using multiple cameras associated with the multiple user devices;
obtain the multiple images from the multiple user devices, stored images associated with the object, and rendered images of a virtual object corresponding to the object;
rank the multiple images from the multiple user devices, the stored images associated with the object, and the rendered images of the virtual object corresponding to the object based on a criterion to obtain multiple ranked images; and
present at the first user device at least a portion of the multiple ranked images including a highest ranked image among the multiple ranked images, wherein the highest ranked image is accented.

8. A method comprising:
receiving a first request associated with a first user device to record, using a first light sensor, a first visual representation of an object in a surrounding environment associated with the first user device,
wherein the first request includes an indication to zoom the first light sensor, wherein zooming the first light sensor enlarges an appearance of the object in the first visual representation;
identify a group of user devices that can use each other's cameras to obtain a zoomed-in appearance of the object,
wherein the group of user devices includes the first user device and a second user device;
sending a second request to the second user device among the group of user devices to record a second visual representation of the object in the surrounding environment using a second light sensor associated with the second user device,
wherein the second user device is closer to the object than the first user device and
wherein a first orientation associated with the first user device and a second orientation associated with the second user device satisfies a first criterion;
causing the second user device to record the second visual representation of the object using the second light sensor;
receiving the second visual representation from the second user device; and
providing the second visual representation to a display of the first user device.

9. The method of claim 8, comprising:
sending the first request to multiple user devices to record multiple visual representations of the object in the surrounding environment using multiple light sensors associated with the multiple user devices;
obtaining the multiple visual representations from the multiple user devices;
ranking the multiple visual representations based on a second criterion to obtain multiple ranked visual representations; and
presenting at the first user device at least a portion of the multiple ranked visual representations including a highest ranked visual representation among the multiple ranked visual representations,
wherein the highest ranked visual representation is accented.

10. The method of claim 8, comprising:
sending the first request to multiple user devices to record multiple visual representations of the object in the surrounding environment using multiple light sensors associated with the multiple user devices;
obtaining the multiple visual representations from the multiple user devices;
combining at least a portion of the multiple visual representations to obtain a combined image; and
presenting the combined image on the first user device.

11. The method of claim 8, comprising:
receiving multiple visual representations including multiple timestamps,
wherein a timestamp among the multiple timestamps indicates when a particular visual representation among the multiple visual representations is recorded;
grouping the multiple visual representations into multiple groups based on the multiple timestamps; and presenting the multiple groups on the display of the first user device, thereby enabling a user of the first user device to view the multiple visual representations under different lighting conditions.

12. The method of claim 8, comprising:
sending the first request to multiple user devices to record multiple visual representations of the object in the surrounding environment using multiple light sensors associated with the multiple user devices;
obtaining the multiple visual representations from the multiple user devices;
based on the multiple visual representations, creating a three-dimensional model associated with the object;
receiving a third request to create a third visual representation associated with the object; and
rendering the three-dimensional model associated with the object to create the third visual representation.

13. The method of claim 8, comprising:
sending the first request to multiple user devices to record multiple visual representations of the object in the surrounding environment using multiple light sensors associated with the multiple user devices;
obtaining the multiple visual representations from the multiple user devices, stored images associated with the object, and rendered images of a virtual object corresponding to the object;
ranking the multiple visual representations from the multiple user devices, the stored images associated with the object, and the rendered images of the virtual object corresponding to the object based on a second criterion to obtain multiple ranked visual representations; and
presenting at the first user device at least a portion of the multiple ranked visual representations including a highest ranked visual representation among the multiple ranked visual representations,
wherein the highest ranked visual representation is accented.

14. A system comprising:
at least one hardware processor; and
at least one non-transitory memory storing instructions which, when executed by the at least one hardware processor, cause the system to:
receive a first request associated with a first user device to record, using a first light sensor, a first visual representation of an object in a surrounding environment associated with the first user device,
wherein the first request includes an indication to zoom the first light sensor,
wherein zooming the first light sensor enlarges an appearance of the object in the first visual representation;
identify a group of user devices that can use each other's cameras to obtain a zoomed-in appearance of the object,
wherein the group of user devices includes the first user device and a second user device;
send a second request to the second user device among the group of user devices to record a second visual representation of the object in the surrounding environment using a second light sensor associated with the second user device,
wherein the second user device is closer to the object than the first user device and
wherein a first orientation associated with the first user device and a second orientation associated with the second user device satisfies a first criterion;
cause the second user device to record the second visual representation of the object using the second light sensor;
receive the second visual representation from the second user device; and
provide the second visual representation to a display of the first user device.

15. The system of claim 14, comprising instructions to:
send the first request to multiple user devices to record multiple visual representations of the object in the surrounding environment using multiple light sensors associated with the multiple user devices;
obtain the multiple visual representations from the multiple user devices;
rank the multiple visual representations based on a second criterion to obtain multiple ranked visual representations; and
present at the first user device at least a portion of the multiple ranked visual representations including a highest ranked visual representation among the multiple ranked visual representations,
wherein the highest ranked visual representation is accented.

16. The system of claim 15, wherein the second criterion includes: a similarity of the first orientation and a third orientation associated with a third device among the multiple user devices, a proximity between the third device among the multiple user devices and the object, or an aesthetic appeal associated with the multiple visual representations.

17. The system of claim 14, comprising instructions to:
send the first request to multiple user devices to record multiple visual representations of the object in the surrounding environment using multiple light sensors associated with the multiple user devices;
obtain the multiple visual representations from the multiple user devices;
combine at least a portion of the multiple visual representations to obtain a combined image; and
present the combined image on the first user device.

18. The system of claim 14, comprising instructions to:
receive multiple visual representations including multiple timestamps,
wherein a timestamp among the multiple timestamps indicates when a particular visual representation among the multiple visual representations is recorded;
group the multiple visual representations into multiple groups based on the multiple timestamps; and
present the multiple groups on the display of the first user device, thereby enabling a user of the first user device to view the multiple visual representations under different lighting conditions.

19. The system of claim 14, comprising instructions to:
send the first request to multiple user devices to record multiple visual representations of the object in the surrounding environment using multiple light sensors associated with the multiple user devices;
obtain the multiple visual representations from the multiple user devices;
based on the multiple visual representations, create a three-dimensional model associated with the object;
receive a third request to create a third visual representation associated with the object; and
render the three-dimensional model associated with the object to create the third visual representation.

20. The system of claim 14, comprising instructions to:
send the first request to multiple user devices to record multiple visual representations of the object in the surrounding environment using multiple light sensors associated with the multiple user devices;
obtain the multiple visual representations from the multiple user devices, stored images associated with the object, and rendered images of a virtual object corresponding to the object;
rank the multiple visual representations from the multiple user devices, the stored images associated with the object, and the rendered images of the virtual object corresponding to the object based on a second criterion to obtain multiple ranked visual representations; and
present at the first user device at least a portion of the multiple ranked visual representations including a highest ranked visual representation among the multiple ranked visual representations,
wherein the highest ranked visual representation is accented.

* * * * *